United States Patent
Krishnamurthy et al.

(10) Patent No.: US 9,344,248 B2
(45) Date of Patent: May 17, 2016

(54) POSITIONING REFERENCE SIGNAL ASSISTANCE DATA SIGNALING FOR ENHANCED INTERFERENCE COORDINATION IN A WIRELESS COMMUNICATION NETWORK

(75) Inventors: Sandeep H. Krishnamurthy, Arlington Heights, IL (US); Robert T. Love, Barrington, IL (US); Ajit Nimbalker, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 23 days.

(21) Appl. No.: 13/253,812

(22) Filed: Oct. 5, 2011

(65) Prior Publication Data

US 2012/0122440 A1    May 17, 2012

Related U.S. Application Data

(60) Provisional application No. 61/413,153, filed on Nov. 12, 2010.

(51) Int. Cl.
| | | |
|---|---|---|
| H04M 3/00 | (2006.01) | |
| H04L 5/00 | (2006.01) | |
| H04L 27/00 | (2006.01) | |
| H04L 27/26 | (2006.01) | |
| H04W 24/10 | (2009.01) | |
| H04W 72/08 | (2009.01) | |

(52) U.S. Cl.
CPC .......... H04L 5/0053 (2013.01); H04L 27/0012 (2013.01); H04L 27/2601 (2013.01); H04W 24/10 (2013.01); H04W 72/082 (2013.01)

(58) Field of Classification Search
CPC .................................................... H04W 28/24
USPC .................................................. 455/520–560
See application file for complete search history.

(56) References Cited

U.S. PATENT DOCUMENTS

| | | |
|---|---|---|
| 7,440,509 B2 | 10/2008 | Baum |
| 7,583,760 B2 | 9/2009 | Bernhardsson et al. |
| 7,746,951 B2 | 6/2010 | Hwang et al. |

(Continued)

FOREIGN PATENT DOCUMENTS

| | | |
|---|---|---|
| EP | 1638224 B1 | 12/2006 |
| EP | 1811689 A1 | 7/2007 |

(Continued)

OTHER PUBLICATIONS

3GPP TSG RAN WG1 #62bis, R1-105750 "[Draft] LS on time-domain extension of Rel 8/9 backhaul-based ICIC for Macro-Pico scenario" Alcatel-Lucent, Alcatel-Lucent Shanghai Bell, Xi'an, China, Oct. 11-15, 2010, 2 pages.

(Continued)

*Primary Examiner* — Keith Fang
(74) *Attorney, Agent, or Firm* — Faegre Baker Daniels LLP

(57) ABSTRACT

A method in a wireless communication terminal is disclosed. The method includes receiving a first signal including a desired second signal and an interference component, wherein the interference component includes at least a third signal transmitted in an Almost Blank Subframe (ABS) by a neighbor cell, and configuring the wireless communication terminal to employ interference reduction to process the first signal based on a configuration of the interference component.

19 Claims, 6 Drawing Sheets

(56) References Cited

U.S. PATENT DOCUMENTS

| | | | |
|---|---|---|---|
| 7,773,705 | B2 | 8/2010 | Jung et al. |
| 7,883,760 | B2 | 2/2011 | Bogue |
| 8,456,996 | B2 | 6/2013 | Bhattacharjee et al. |
| 8,837,301 | B2 | 9/2014 | Krishnamurthy |
| 2005/0099973 | A1 | 5/2005 | Qiu et al. |
| 2009/0005029 | A1 | 1/2009 | Wang et al. |
| 2009/0092178 | A1 | 4/2009 | Sayana et al. |
| 2009/0232073 | A1 | 9/2009 | Yan et al. |
| 2009/0252077 | A1 | 10/2009 | Khandekar et al. |
| 2009/0264077 | A1 | 10/2009 | Damnjanovic |
| 2009/0325591 | A1 | 12/2009 | Liu et al. |
| 2010/0009705 | A1* | 1/2010 | Budianu et al. ............... 455/501 |
| 2010/0029262 | A1 | 2/2010 | Wang et al. |
| 2010/0034092 | A1 | 2/2010 | Krishnamurthy et al. |
| 2010/0035615 | A1 | 2/2010 | Kitazoe et al. |
| 2010/0056123 | A1 | 3/2010 | Julian et al. |
| 2010/0105317 | A1* | 4/2010 | Palanki et al. ................... 455/9 |
| 2010/0110901 | A1 | 5/2010 | Wong et al. |
| 2010/0111018 | A1 | 5/2010 | Chang |
| 2010/0112958 | A1 | 5/2010 | Krishnamurthy et al. |
| 2010/0118856 | A1 | 5/2010 | Krishnamurthy et al. |
| 2010/0178912 | A1* | 7/2010 | Gunnarsson et al. ......... 455/423 |
| 2010/0190447 | A1 | 7/2010 | Agrawal et al. |
| 2010/0223522 | A1 | 9/2010 | Duggan |
| 2010/0240370 | A1 | 9/2010 | Pandit et al. |
| 2010/0271965 | A1* | 10/2010 | Siomina et al. ............... 370/252 |
| 2010/0272032 | A1 | 10/2010 | Sayana et al. |
| 2010/0278132 | A1 | 11/2010 | Palanki et al. |
| 2010/0317343 | A1 | 12/2010 | Krishnamurthy et al. |
| 2010/0323693 | A1 | 12/2010 | Krishnamurthy et al. |
| 2011/0013615 | A1 | 1/2011 | Lee et al. |
| 2011/0081933 | A1 | 4/2011 | Suh et al. |
| 2011/0096680 | A1 | 4/2011 | Lindoff et al. |
| 2011/0105144 | A1 | 5/2011 | Siomina et al. |
| 2011/0110251 | A1 | 5/2011 | Krishnamurthy et al. |
| 2011/0143766 | A1* | 6/2011 | Sun et al. ................... 455/452.2 |
| 2011/0170496 | A1 | 7/2011 | Fong et al. |
| 2011/0194632 | A1 | 8/2011 | Clerckx et al. |
| 2011/0199986 | A1 | 8/2011 | Fong et al. |
| 2011/0249578 | A1 | 10/2011 | Nayeb Nazar et al. |
| 2011/0256861 | A1 | 10/2011 | Yoo et al. |
| 2011/0274097 | A1 | 11/2011 | Zhang et al. |
| 2011/0275394 | A1* | 11/2011 | Song et al. ..................... 455/509 |
| 2011/0286346 | A1 | 11/2011 | Barbieri et al. |
| 2012/0063321 | A1 | 3/2012 | Chandrasekhar et al. |
| 2012/0113844 | A1 | 5/2012 | Krishnamurthy |
| 2012/0113961 | A1 | 5/2012 | Krishnamurthy |
| 2012/0122472 | A1 | 5/2012 | Krishnamurthy et al. |
| 2012/0300699 | A1 | 11/2012 | Kamuf et al. |
| 2013/0039254 | A1* | 2/2013 | Kim et al. ..................... 370/312 |
| 2013/0083719 | A1 | 4/2013 | Seo et al. |

FOREIGN PATENT DOCUMENTS

| | | |
|---|---|---|
| WO | 9627246 A1 | 9/1996 |
| WO | 0122600 A2 | 3/2001 |
| WO | 2009129413 A2 | 10/2009 |
| WO | 2009/142559 A1 | 11/2009 |
| WO | 2009142559 A9 | 11/2009 |
| WO | 2010053793 A2 | 5/2010 |
| WO | 2010104334 A2 | 9/2010 |
| WO | 2011021974 A1 | 2/2011 |
| WO | 2011057037 A2 | 5/2011 |
| WO | 2011099910 A1 | 8/2011 |

OTHER PUBLICATIONS

3GPP TSG RAN WG4 Meeting # AH-04, R4-103738 "Impact of Enhanced ICIC for Non-CA based Deployment on RAN4 Requirements" Ericsson, St-Ericsson, Xi'an, China, Oct. 11-15, 2010, 5 pages.

Krishnamurthy et al., "Method for Cell Search in Synchronous Interference Limited Channels" U.S. Appl. No. 12/981,724, filed Dec. 30, 2010, 47 pages.

Patent Cooperation Treaty, "PCT Search Report and Written Opinion of the International Searching Authority" for International Application No. PCT/US2011/060317 Mar. 1, 2012, 14 pages.

3GPP TSG RAN WG4 2010 AH#4, R4-103790 "eICIC RLM and RRM requirements" Qualcomm Incorporated, Xi'an, China, Oct. 11-15, 2010, 6 pages.

3GPP TSG RAN WG1 #62, R1-104346 "Potential Problems and Performance Analysis in Time Domain Solutions to UE" CATT, Madrid, Spain, Aug. 23-27, 2010, 6 pages.

3GPP TSG RAN WG1 #62, R1-104864 "Enhanced ICIC for co-channel CSG deployments" Ericsson, ST-Ericsson, Madrid, Spain, Aug. 23-27, 2010, 6 pages.

3GPP TSG RAN WG1 #62bis, R1-105335 "Details of almost blank subframes" Ericsson, ST-Ericsson, Xi'an, China, Oct. 11-15, 2010, 6 pages.

3GPP TSG RAN WG1 #61, R1-102618 "Considerations on non-CA based heterogeneous deployments" Ericsson, ST-Ericsson, Montreal, Canada, May 10-14, 2010, 4 pages.

3GPP TSG RAN WG1 #62bis, R1-105551 "TDM eICIC coordination between macro eNBS and CSG Home eNBs." Nokia Siemens Networks, Nokia, Xi'an, China, Oct. 11-15, 2010, 6 pages.

3GPP TSG RAN WG2 #71bis, R2-105786 "eICIC: Idle Mode considerations" Qualcomm Incorporated, Xi'an, China, Oct. 11-15, 2010, 2 pages.

3GPP TSG-RAN WG1 #62 bis, R1-105793 "LS on time-domain extension of Rel 8/9 backhaul-based ICIC for Macro-Pico scenario" RAN1, Oct. 11-15, 2010, Xi'an, China 2 pages.

Patent Cooperation Treaty, "PCT Search Report and Written Opinion of the International Searching Authority" for International Application No. PCT/US2011/059248 Feb. 13, 2012, 30 pages.

3GPP TSG RAN WG4 #53, R4-094245 "Interference control for LTE Rel-9 HeNB cells" Nokia Siemens Networks, Nokia, Jeju, Korea, Nov. 9-13, 2009, 10 pages.

3GPP TSG RAN WG4 #57, R4-104648 "Paging Channel Reliability Issue in Idle Mode and ABSF Patterns" Motorola, Jacksonville, USA, Nov. 15-19, 2010, 5 pages.

David Lopez-Perez et al., "Enhanced Intercell Interference Coordination Challenges in Heterogeneous Networks" IEEE Wireless Communications, vol. 18, No. 3, Jun. 1, 2011, pp. 22-30.

3GPP TSG RAN WG4 #57, R4-104647 "Downlink Performance in the Presence of Interference from ABSFs" Motorola, Jacksonville, USA, Nov. 15-19, 2010, 8 pages.

3GPP TSG RAN WG4 #57, R4-104746 "Updated Downlink Performance Results for eICIC" Motorola, Jacksonville, USA, Nov. 15-19, 2010, 3 pages.

Lars Lindbom et al., "Enhanced Inter-cell Interference Coordination for Heterogeneous Networks in LTE-Advanced: A Survey" Dec. 6, 2011, pp. 1-18.

Patent Cooperation Treaty, "PCT Search Report and Written Opinion of the International Searching Authority" for International Application No. PCT/US2011/059268 Feb. 3, 2012, 20 pages.

3GPP TSG RAN WG2 Meeting #72, R2-106171 "Resource-specific measurement in Idle Mode for eICIC" New Postcom, Jacksonville (FL), USA, Nov. 15-19, 2010, 4 pages.

3GPP TS 36.214 V9.2.0 (Jun. 2010), Technical Specification, 3rd Generation Partnership Project; Technical Specification Group Radio Access Network; Evolved Universal Terrestrial Radio Access (E-UTRA); Physical layer; Measurements (Release 9), 14 pages.

State Intellectual Property Office of the People's Republic of China, Notification of the First Office Action for Chinese Patent Application No. 201180053893.0 (related to above-captioned patent application), mailed May 19, 2014.

Korean Intellectual Property Office, Notice of Preliminary Rejection for Korean Patent Application No. 10-2013-7011837 (related to above-captioned patent application), mailed Apr. 17, 2014.

Korean Intellectual Property Office, Notice of Preliminary Rejection for Korean Patent Application No. 10-2013-7011839 (related to above-captioned patent application), mailed Jul. 28, 2014.

United States Patent and Trademark Office, Non-Final Rejection for U.S. Appl. No. 14/486,418 (related to above-captioned patent application), mailed Aug. 14, 2015.

* cited by examiner

POSITIONING REFERENCE SIGNAL ASSISTANCE DATA SIGNALING FOR ENHANCED INTERFERENCE COORDINATION IN A WIRELESS COMMUNICATION NETWORK

CROSS-REFERENCE TO RELATED APPLICATIONS

The present application claims benefits to provisional Application No. 61/413,153 filed on 12 Nov. 2010 under 35 U.S.C. 119, the contents of which are incorporated herein by reference.

FIELD OF THE DISCLOSURE

The present invention relates generally to wireless communication networks and, more particularly, to an apparatus and method for interference measurements in wireless terminals capable of enhanced inter-cell interference coordination methods.

BACKGROUND

Wireless communication networks are well known. Some networks are completely proprietary, while others are subject to one or more standards to allow various vendors to manufacture equipment for a common system. One such standards-based network is the Universal Mobile Telecommunications System (UMTS). UMTS is standardized by the Third Generation Partnership Project (3GPP), a collaborative effort by groups of telecommunications associations to make a globally applicable third generation (3G) mobile phone system specification within the scope of the International Mobile Telecommunications-2000 project of the International Telecommunication Union (ITU). Efforts are currently underway to develop an evolved UMTS standard, which is typically referred to as UMTS Long Term Evolution (E-UTRA) or Evolved UMTS Terrestrial Radio Access (E-UTRA).

According to Release 8 of the E-UTRA or LTE standard or specification, downlink communications from a base station (referred to as an "enhanced Node-B" or simply "eNB") to a wireless communication device (referred to as "user equipment" or "UE") utilize orthogonal frequency division multiplexing (OFDM). In OFDM, orthogonal subcarriers are modulated with a digital stream, which may include data, control information, or other information, so as to form a set of OFDM symbols. The subcarriers may be contiguous or discontiguous and the downlink data modulation may be performed using quadrature phase shift-keying (QPSK), 16-ary quadrature amplitude modulation (16QAM), or 64QAM. The OFDM symbols are configured into a downlink subframe for transmission from the base station. Each OFDM symbol has a time duration and is associated with a cyclic prefix (CP). A cyclic prefix is essentially a guard period between successive OFDM symbols in a subframe. According to the E-UTRA specification, a normal cyclic prefix is about five (5) microseconds and an extended cyclic prefix is 16.67 microseconds.

In contrast to the downlink, uplink communications from the UE to the eNB utilize single-carrier frequency division multiple access (SC-FDMA) according to the E-UTRA standard. In SC-FDMA, block transmission of QAM data symbols is performed by first discrete Fourier transform (DFT)-spreading (or precoding) followed by subcarrier mapping to a conventional OFDM modulator. The use of DFT precoding allows a moderate cubic metric/peak-to-average power ratio (PAPR) leading to reduced cost, size and power consumption of the UE power amplifier. In accordance with SC-FDMA, each subcarrier used for uplink transmission includes information for all the transmitted modulated signals, with the input data stream being spread over them. The data transmission in the uplink is controlled by the eNB, involving transmission of scheduling requests (and scheduling information) sent via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher-order modulation and adaptive modulation and coding (AMC), large spectral efficiency is possible by scheduling users with favorable channel conditions.

E-UTRA systems also facilitate the use of multiple input and multiple output (MIMO) antenna systems on the downlink to increase capacity. As is known, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include such spatial parameters as rank indicator, or the number of data streams sent on the same resources; precoding matrix index (PMI); rank indicator (RI) and coding parameters, such as a modulation and coding scheme (MCS) or a channel quality indicator (CQI). Together MCS or CQI, PMI and RI constitute elements of the Channel State Information (CSI) which convey the quality of MIMO channel indicative of the reliability and condition number of the channel capable of supporting multi-stream communication between the eNB and the UE. For example, if a UE determines that the link can support a rank greater than one, it may report multiple CQI values (e.g., two CQI values when rank=2 by signaling of the corresponding RI). Further, the link quality measurements may be reported on a periodic or aperiodic basis, as instructed by an eNB, in one of the supported feedback modes. The reports may include wideband or subband frequency selective information of the parameters. The eNB may use the rank information, the CQI, and other parameters, such as uplink quality information, to serve the UE on the uplink and downlink channels.

E-UTRA systems must be compliant to regulatory requirements on spurious emissions on licensed bands in different regions of the world. E-UTRA follows the "uplink after downlink" principle which means that a UE must transmit on its uplink only when its downlink is reliable. In other words, a UE that does not have a reliable downlink must continuously monitor the quality of the downlink signal by tracking the downlink signal quality (e.g., based on channel state estimation) and stop transmission on its uplink if the downlink signal quality falls below a threshold. In E-UTRA, this is enabled by means of Radio Link Monitoring (RLM) UE procedures where a UE continuously monitors the cell-specific reference signal (CRS) on the downlink and determines the channel state (including estimating the propagation channel between the eNB and the UE and the underlying interference on the same carrier). Qout is defined as the condition that the channel quality between eNB and the UE is such that the Block Error Rate (BLER) of a first hypothetical PDCCH transmission exceeds 10%. This event is also denoted as an "out-of-sync" event. Qin is defined as the condition that the channel quality between eNB and the UE is such that the BLER of a second hypothetical PDCCH transmission drops below 2%. This event is also denoted as an "in-sync" event. The UE monitors the channel state in RRC_CONNECTED mode continuously or periodically in both non-discontinuous reception (non-DRX) and discontinuous reception (DRX) states to evaluate whether Qout or Qin has occurred. Upon several successive Qout detections, the UE must determine that a Radio Link Problem (RLP) has occurred. In the RLP state, the UE must assume that it has lost its downlink with the serving eNB and start monitoring the link for recovery. If a Qin is detected within a certain duration of time as configured by the eNB by means of a Radio Resource Control (RRC) timer, the UE resumes normal RRC_CONNECTED operation. On the other hand, if a Qin is not detected within the said duration of time, the UE must determine that a Radio Link Failure (RLF) has occurred and must stop all uplink transmission within 40 ms. The RLM procedure reduces the probability that a UE jams the uplink of a neighbor cell when the UE has lost the serving cell downlink but has not been handed over to a different cell by the network due to Radio Resource Management (RRM) inefficiencies.

Like other 3GPP standards, E-UTRA supports mobility of UEs by RRM measurements and associated support for RRC signaling including specified eNB and UE behavior in both RRC_CONNECTED and RRC_IDLE states. In the RRC_CONNECTED state, a UE can be configured to measure and report Reference Signal Received Power (RSRP) and Reference Signal Received Quality (RSRQ) for both the serving cell and the neighbor cells (on the serving cell carrier and inter-frequency carriers). A network element such as the eNB or the Mobility Management Entity (MME) can perform UE handovers based on the reported measurements. In RRC_IDLE state, the UE can be configured to measure RSRP and RSRQ and perform cell reselections based on these measurements.

Heterogeneous networks comprise a variety of base stations serving mobile stations. In some systems, the base stations operate on the same carrier frequency. The variety of base stations can include some or all of the following types of base stations: conventional macro base stations (macro cells), pico base station (pico cells), relay nodes and femto base stations (also referred to as femto cells, closed subscriber group (CSG) cells or Home eNodeBs). Macro cells typically have coverage areas that range from several hundreds of meters to several kilometers. Pico cells, relays and femto cells can have coverage areas that are considerably smaller than the coverage area of typical macro cells. Pico cells can have coverage areas of about 100-200 meters. Femto cells are typically used for indoor coverage, and can have coverage areas in the 10s of meters. Relay nodes are characterized by a wireless backhaul to a donor base station, and can have coverage areas similar to pico cells.

A home-base station or femto-cell or pico-eNB or relay node (RN) is referred to as hetero-eNB (HeNB) or a hetero-cell or hetero base station in the sequel. A HeNB can either belong to a CSG as mentioned earlier or can be an open-access cell. HeNBs are used for coverage in a small area (such as a home or office) in contrast with eNBs (also referred to as macro eNBs or macro-cells) which are typically used for coverage over a large area. A CSG is set of one or more cells that allow access only to a certain group of subscribers. HeNB deployments where at least a part of the deployed bandwidth (BW) is shared with macro-cells are considered to be high-risk scenarios from an interference point-of-view. When UEs connected to a macro-cell roam close to a HeNB, the uplink of the HeNB can be severely interfered with particularly when the HeNB is far away (for example >400 m) from the macro-cell, thereby, degrading the quality of service of UEs connected to the HeNB. The problem is particularly severe if the UE is not allowed to access the HeNB that it roams close to (for example, due to the UE not being a member of the CSG of the HeNB). Currently, the existing Rel-8/9 UE measurement framework can be made use of to identify the situation when this interference might occur and the network can handover the UE to an inter-frequency carrier which is not shared between macro-cells and HeNBs to mitigate this problem. However, there might not be any such carriers available in certain networks to handover the UE to. Further, as the penetration of HeNBs increases, being able to efficiently operate HeNBs on the entire available spectrum might be desirable for maximizing spectral efficiency and reducing overall operational cost. Several other scenarios are likely too including the case of a UE connected one HeNB experiencing interference from an adjacent HeNB or a macro cell. The following types of interference scenarios have been identified.

HeNB (aggressor)→MeNB (victim) downlink (DL)
HUE (aggressor)→MeNB (victim) uplink (UL)
MUE (aggressor)→HeNB (victim) UL
MeNB (aggressor)→HeNB (victim) DL
HeNB (aggressor)→HeNB (victim) on DL
HeNB (aggressor)→HeNB (victim) on UL.

Heterogeneous networks can potentially enable an operator to provide improved service to users (e.g., increased data rates, faster access, etc.) with lower capital expenditure. Typically, installation of macro base stations is very expensive as they require towers. On the other hand, base stations with smaller coverage areas are generally much less expensive to install. For example, pico cells can be installed on roof tops and femto cells can be easily installed indoors. The pico and femto cells allow the network to offload user communication traffic from the macro cell to the pico or femto cells. This enables users to get higher throughput and better service without the network operator installing additional macro base stations or provisioning more carrier frequencies for communication. Thus, heterogeneous networks are considered to be an attractive path for evolution of wireless communication networks. 3GPP has commenced work on enabling heterogeneous E-UTRA networks in 3GPP LTE Release 10.

FIG. 1 illustrates an E-UTRA Heterogeneous network comprising a macro cell, pico cells and femto cells operating on a single carrier frequency. A mobile station, also referred to as "user equipment" (UE), may be associated with one of the cells based on its location. The association of a UE to a cell can refer to association in idle mode or connected mode. That is, a UE is considered to be associated with a cell in idle mode if it is camped on the cell in idle mode. Similarly, a UE is considered to be associated with a cell in connected mode if it is configured to perform bi-directional communication with a cell (for example, a UE in E-UTRA radio resource control (RRC) connected mode can be connected to and therefore associate with a cell). A UE associated with a macro cell is referred to macro UE, a UE associated with a pico cell is referred to as a pico UE, and a UE associated with a femto cell is referred to as a femto UE.

Various time-division approaches are possible for ensuring that base stations in heterogeneous networks share the frequency spectrum while minimizing interference. Two approaches can be envisioned. A network can configure time periods when different base stations are required to not transmit. This enables cells that can interfere with one another to transmit in mutually exclusive time periods. For example, a femto cell can be configured with some time periods during which it does not transmit. If a macro UE is located within the coverage of the femto cell, the macro cell can use the time periods during which the femto cell does not transmit data to the UE.

The network can configure time periods where a first base station transmits on all available time periods (e.g., pico eNBs), while a second base station (e.g., macro eNB) transmits only on a subset of the available time periods. A UE connected to the first base station can therefore have two "virtual" channels at different channel qualities depending on how much the second base station's transmission interferes with that for the first (i.e., signal geometry of the first base station relative to the second). The first virtual channel is where only the first base station transmits data while the second base station does not transmit data. The second virtual channel is one where both the first and the second base stations transmit data. The first base station can use adaptive modulation and coding and schedule at different MCS levels on the two virtual channels. In the extreme case, the first base station may not schedule at all on the second virtual channel when interference from the second base station is large.

However, it should be noted that time division approaches can lead to inaccurate or inconsistent RRM, RLM and CSI measurements. For example, if a macro UE located near a femto cell performs measurements during time periods when the femto cell transmits, the measured values can be significantly different from measured values obtained from measurements made during time periods when the femto cell does not transmit. Such measurements can lead to erratic behaviors, such as failed connections, unnecessary handovers and unnecessary cell reselections. In addition, such inaccuracies can lead to suboptimal scheduling on UE downlink leading to inefficient utilization of spectral resources. Therefore, methods are needed for performing measurements of cells that overcome the problems mentioned above.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the one or more embodiments of the present invention.

Skilled artisans will appreciate that elements in the figures are illustrated for simplicity and clarity and have not necessarily been drawn to scale or to include every component of an element. For example, the dimensions of some of the elements in the figures may be exaggerated alone or relative to other elements, or some and possibly many components of an element may be excluded from the element, to help improve the understanding of the various embodiments of the present invention.

DETAILED DESCRIPTION

Figure 1:
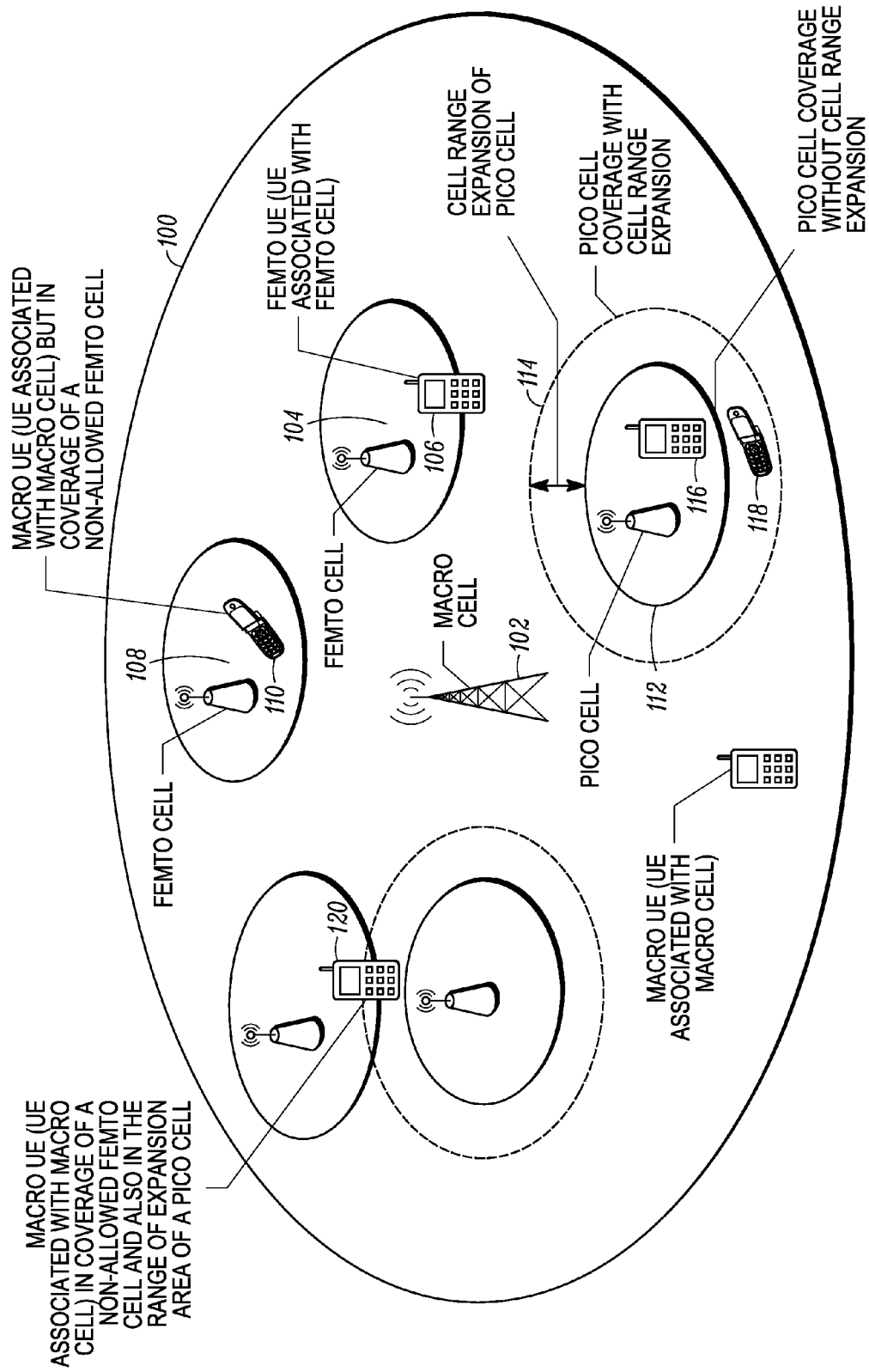
FIG. 1 illustrates a prior art Heterogeneous network comprising macro cells, pico cells and femto cells.
Figure 2:
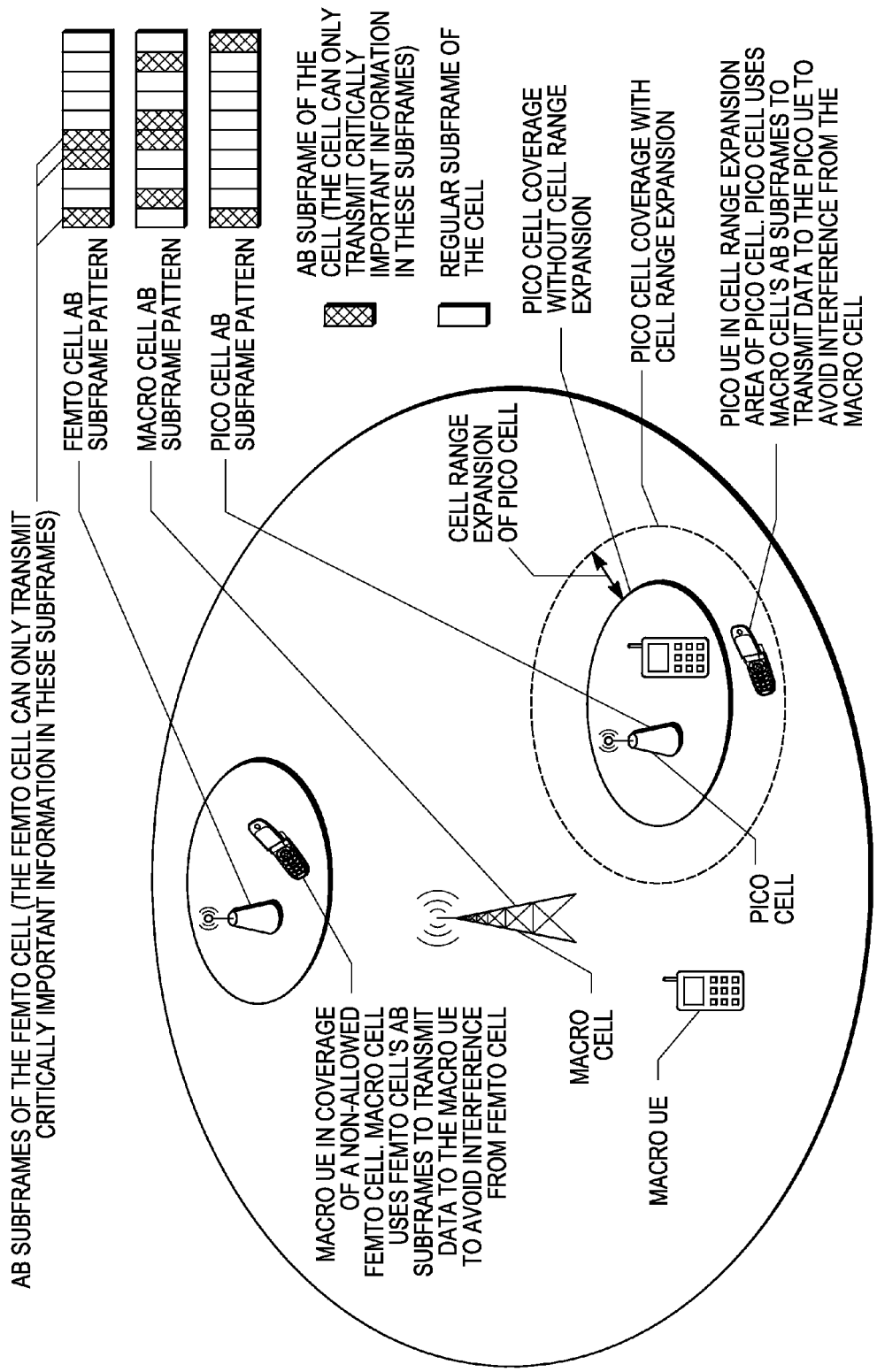
FIG. 2 is an electrical block diagram of a wireless communication system providing wireless communication service to a wireless communication device.

Femto cells are generally used in homes and offices and their precise location and configuration is not entirely under the network operator's control. For example, two femto cells located in nearby homes can have the same physical layer cell identifier (PCID). A femto cell can be a restricted access cell such as a CSG cell. In FIG. 1, a Heterogeneous network 100 comprises a macro cell 102, femto cells 104, 108, 122, pico cells 112, 124 and mobile stations 106, 110, 116, 118, 120, 126. If a UE 110 is not a member of the CSG to which the femto cell 108 belongs, the UE may be unable to access the femto cell. Even if the UE 110 is very close to such a femto cell 108, the UE may be associated with the macro cell. The UE may then experience significant interference to its communication with the macro cell due to transmissions of the femto cell.

Pico cells generally do not restrict access to specific users. However, some operator configurations can allow pico cells to restrict access to certain users. Pico cells are generally fully under the network operator's control and can be used to enhance coverage in locations where the macro cell signal quality may be inadequate. Furthermore, in order to increase offloading of users to pico cells, a network operator can have an association bias towards the pico cell. In FIG. 1 for example, a UE 118 may be made to associate with a pico cell even if the pico cell 112 is not the strongest cell at the UE's 118 location. This is referred to as "cell range expansion" of the pico cell. A UE is said to be the cell range expansion area of a pico cell, if it associates with the pico cell only if an association bias is used, and associates with another cell (e.g., a macro cell 102) if the association bias is not used. If a UE 118 is in the cell range expansion area of the pico cell 112 and is associated with the pico cell 112, it can experience significant interference due to transmissions of a neighbor cell (such as a macro cell 102).

In order to operate multiple cells with overlapping coverage on a carrier frequency, such as in a heterogeneous network 100 in FIG. 1, it is necessary to have coordination between the cells so that the transmissions from the different cells do not interfere with one another. E-UTRA heterogeneous networks will use time division techniques to minimize interference. Specifically, a cell can be configured with patterns of subframes during which it does not schedule user data. Such subframes are referred to as "Blank subframes". Furthermore, it may be necessary to transmit some critically important information in all subframes. For example, it may be necessary to transmit cell-specific reference symbols (CRS) to enable UEs to perform measurements during the subframe. It may also be necessary to transmit primary and secondary synchronization signals (PSS and SSS), primary broadcast channel (PBCH) and System Information Block 1 (SIB1), Paging Channel and the Positioning Reference Signal (PRS). Such information is essential for proper operation of functions such as cell search and maintenance of up-to-date system information. Blank subframes which are not used for scheduling data but can be used for transmission of a restricted set of information (such as the critically important information described above) are referred to as "Almost blank subframes" (AB subframes or ABS or ABSF, and ABSs and ABSFs indicate the plural form of an "almost blank subframe"). In each ABS being transmitted from a base station, the base station can be configured to not transmit any energy on all resource elements, except for resource elements used at least one of (a) CRS, (b) PSS and SSS, (c) PBCH, (d) SIB1, and (e) paging messages.

The time corresponding to the ABS transmission of one cell can be used by a neighboring cell to schedule UEs connected to that (i.e. neighboring) cell. For example, each of a femto cell, a macro cell and a pico cell can be configured with an ABS pattern (i.e., a sequence of subframes with a certain time reuse, where a subset of the subframes are configured as ABSs and the remainder configured for normal downlink scheduling). The patterns can be such that the ABSs of different cells can overlap. Alternatively the patterns can be mutually exclusive, so that ABSs of two cells do not overlap. Also, some cells may not be configured with an AB subframe pattern. As indicated above, a cell can be configured to only transmit critically important information during its AB subframes. While ABS are typically defined for the Downlink, ABS or Blank subframes can also be defined for uplink transmissions wherein the UE is requested to not transmit any uplink data or uplink control information. Thus, any uplink transmissions in the ABS may be suspended until the next transmission opportunity for the corresponding information. For data, the next transmission opportunity may be determined by the Hybrid Automatic repeat request (HARQ) timing, and for uplink control information such as CQI/RI/PMI/Scheduling Request (SR), the next transmission opportunity may be determined based on the corresponding schedule as indicated to the UE by the eNB, based on dynamic, semi-static and/or higher layer signaling.

The use of AB subframe patterns is described further below. A macro UE may be in the coverage of a non-allowed femto cell, such as a CSG cell whose CSG the UE is not a member. In FIG. 1, UE 110 represents such a UE and femto cell 108 represents such a femto cell. Such a macro UE can experience interference from the femto cell, making communication between the macro UE and the macro cell difficult. To overcome the interference, the macro cell can transmit data to the UE only in the ABSs of the femto cell. Since the femto cell only transmits critically important signals in the ABSs, the macro cell can avoid most of the interference from the femto cell and successfully transmit data to the macro UE in the ABSs of the femto cell.

Similarly, a pico UE may be in the cell range expansion area of the pico cell. In FIG. 1, UE 118 represents such a pico UE and pico cell 112 represents such a pico cell. Such a pico UE can experience a high interference from a neighbor cell, such as macro cell 102), making communication between the pico UE and the pico cell difficult. In order to overcome the interference, the pico cell can transmit data to the UE only in the ABSs of the macro cell. Since the macro cell only transmits critically important signals in the AB subframes, the pico cell can avoid most of the interference from the macro cell and successfully transmit data to the pico UE in the AB subframes of the macro cell. Further, the pico cell can also transmit in the non-ABSs of the macro cell, but can schedule a lower MCS to account for the degraded signal quality in such subframes. The pico cell may request the UE to report two CQI/PMI/RI values, one for the subframes where the macro cell is transmitting ABS, and another for when the macro cell is transmitting regular subframes. Alternatively, the pico cell may require the UE to report the CQI/PMI/RI values based on a restricted set of resources that is signaled to the UE via dynamic or higher layer signaling. The pico cell may then apply suitable filtering and/or processing to keep track of the multiple CQI/PMI/RI levels for the subframes with and without the interference.

When different cells use different patterns of ABSs, the RRM, RLM and CSI measurements performed by UEs in the heterogeneous network can result in unpredictable and undesirable behavior. UEs perform RLM measurements in connected mode to ensure that the serving cell signal conditions are adequate to schedule the UE. UEs perform RRM measurements to support handovers in connected mode and reselections in idle mode. UE performs CSI measurements to support optimal scheduling by the base station. For example, in FIG. 1, macro UE 110 in the coverage of a non-allowed femto cell 108 may be performing RLM measurements of the macro cell 102 signal. Due to interference from the femto cell 108 in subframes during which the femto cell schedules (i.e., not the ABSs of the femto cell), the macro UE can conclude that the radio link between the macro cell and the macro UE has failed. The UE can make such a conclusion even if it can be successfully scheduled by the macro cell during the ABSs of the femto cell.

Similarly, in FIG. 1, the macro UE 110 in the coverage of a non-allowed femto cell 108 may be performing RRM measurements of the serving cell and neighbor cells. Due to interference from the femto cell, the UE may measure a low value the macro cell signal level and transmit a measurement report indicating the low value to the network. As a result of the measurement report, the network can perform a handover of the UE to another frequency or to another radio access technology, such as UMTS or GSM. This is an undesirable outcome, as the UE can be successfully scheduled by the macro cell in the femto cell's ABSs.

Similarly, in FIG. 1, the macro UE 110 in the coverage of a non-allowed femto cell 108 may be performing CSI measurements of the serving cell. Due to interference from the femto cell, the UE may measure a low value of the macro cell's channel quality and transmit a low value of CQI (and potentially a low value of RI or a suboptimal value of PMI) to the network. As a result of the low value of CQI, the base station can avoid scheduling the UE or transmit a very small amount of data to the UE. Thus, the data rate experienced by the UE is reduced, although it may be possible to maintain a high data rate for the UE by scheduling during the femto cell's ABSs.

Similar observations can be made for pico UEs. In FIG. 1, for example, a pico UE 118 in the coverage expansion area of a pico cell 112 can conclude that the radio link between the pico UE and the pico cell has failed due to interference from the macro cell 102. The pico UE 118 in the coverage expansion area of a pico cell 112 can report low measured values for the pico cell signal level resulting in a handover away from the pico cell. In order to overcome these problems, it is necessary to restrict measurements performed by the UE to certain subframes.

Given that different cells can be configured with different ABS patterns, methods are needed for determining which subframes should be used by a UE to perform various measurements under different scenarios. In the foregoing, the embodiments described in the context of ABSs. However, it should be clear that the same methods are applicable to blank subframes and subframes that are only partially used for scheduling. That is, subframes in which only some of the time-frequency resources are used for scheduling. In the context of the disclosure, measurements can include, but are not limited to, one or more of (a) measurements required to perform cell identification, (b) RRM measurements such as RSRP and RSRQ measurements of cells detected by the UE, (c) measurements required for performing radio link monitoring, or (d) channel state measurements, such as measurements needed for performing channel state information reporting and channel quality indication reporting.

Figure 3:
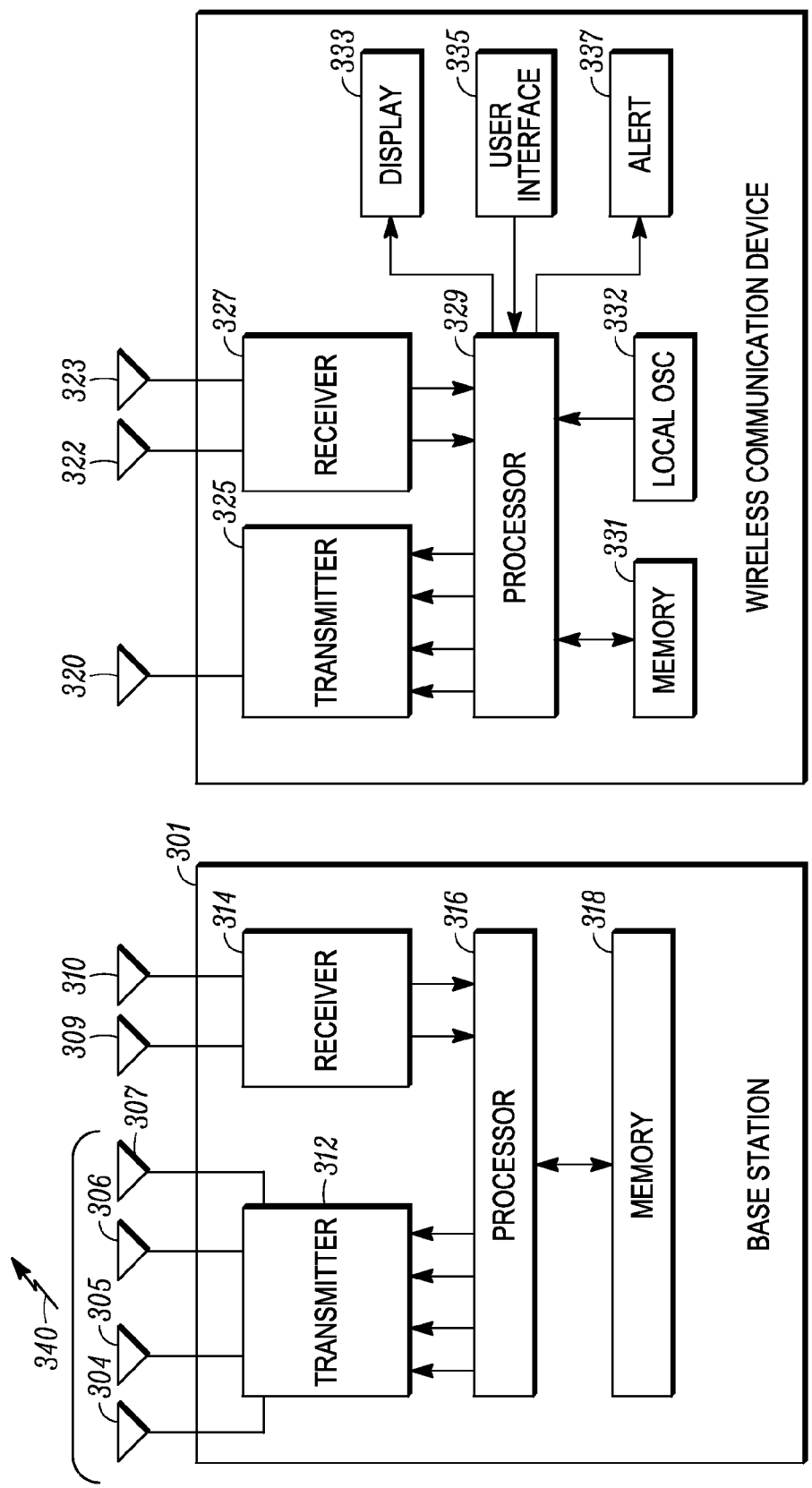
FIG. 3 illustrates electrical block diagrams of an exemplary base station usable in the wireless communication system of FIG. 2 and a wireless communication device.

FIG. 3 illustrates electrical block diagrams of a UE and an exemplary eNB usable in the wireless communication system. Each base station 301 can include one or more transmit antennas 304-307 (four shown for illustrative purposes), one or more receive antennas 309, 310 (two shown for illustrative purposes), one or more transmitters 312 (one shown for illustrative purposes), one or more receivers 314 (one shown for illustrative purposes), one or more processors 316 (one shown for illustrative purposes), and memory 318. Although illustrated separately, the transmitter 312 and the receiver 314 may be integrated into one or more transceivers as is well understood in the art. By including multiple transmit antennas 304-307 and other appropriate hardware and software as would be understood by those of ordinary skill in the art, the base station 301 may support use of a multiple input and multiple output (MIMO) antenna system for downlink (base station-to-wireless communication device) communications. The MIMO system facilitates simultaneous transmission of downlink data streams from multiple transmit antennas 304-307 depending upon a channel rank, for example as indicated by the wireless communication device 201 or as preferred by the base station 301. A rank supplied by the UE or enables the base station 301 to determine an appropriate multiple antenna configuration (e.g., transmit diversity, open loop spatial multiplexing, closed loop spatial multiplexing, etc.) for a downlink transmission in view of the current downlink channel conditions.

The processor 316, which is operably coupled to the transmitter 312, the receiver 314, and the memory 318, can be one or more of a microprocessor, a microcontroller, a digital signal processor (DSP), a state machine, logic circuitry, any combination thereof, or any other device or combination of devices that processes information based on operational or programming instructions stored in the memory 318. One of ordinary skill in the art will appreciate that the processor 316 can be implemented using multiple processing devices as may be required to handle the processing requirements of the present invention and the various other functions of the base station 301. One of ordinary skill in the art will further recognize that when the processor 316 has one or more of its functions performed by a state machine or logic circuitry, the memory containing the corresponding operational instructions can be embedded within the state machine or logic circuitry as opposed to being external to the processor 316.

The memory 318, which may be a separate element as depicted in FIG. 3 or may be integrated into the processor 316, can include random access memory (RAM), read-only memory (ROM), FLASH memory, electrically erasable programmable read-only memory (EEPROM), removable memory, a hard disk, and/or various other forms of memory as are well known in the art. The memory 318 can include various components, such as, for example, one or more program memory components for storing programming instructions executable by the processor 316, one or more address memory components for storing an identifier associated with the base station 301 as well as for storing addresses for wireless communication devices currently in communication with the base station 301, and various data storage components. The program memory component of the memory 318 may include a protocol stack for controlling the transfer of information generated by the processor 316 over the data and/or control channels of the E-UTRA. It will be appreciated by one of ordinary skill in the art that the various memory components can each be a group of separately located memory areas in the overall or aggregate memory 318 and that the memory 318 may include one or more individual memory elements.

In one embodiment, the base station transmitter 312, receiver 314, and processor 316 are designed to implement and support a wideband wireless protocol, such as the Universal Mobile Telecommunications System (UMTS) protocol, the E-UTRA protocol, the 3GPP Long Term Evolution (E-UTRA) protocol, or a proprietary protocol, operating to communicate digital information, such as user data (which may include voice, text, video, and/or graphical data) and/or control information, between the base station 301 and the UE over various types of channels. In an E-UTRA system, an uplink data channel may be a Physical Uplink Shared Channel (PUSCH), an uplink control channel may be a physical uplink control channel (PUCCH), a downlink control channel may be a physical downlink control channel (PDCCH), and downlink data channel may be a physical downlink shared channel (PDSCH). Uplink control information may be communicated over the PUCCH and/or the PUSCH and downlink control information is communicated typically over the PDCCH. The UE may further transmit uplink sounding reference signals to assist the eNB on scheduling uplink (for frequency division duplex (FDD)) and for one or both uplink and downlink for time-division duplex (TDD). In the Rel-8 LTE and beyond LTE systems such as Rel-10 (also known as LTE-Advanced), the base station transmits using an OFDM modulation scheme on the downlink and the UEs transmit on the uplink using a single carrier frequency division multiple access (SC-FDMA) scheme and/or Discrete Fourier Transform Spread OFDM (DFT-SOFDM). On the UL, the UE may transmit using contiguous or non-contiguous resource allocations and the UE may also transmit data and control on the uplink simultaneously using the so-called simulateneous PUCCH and PUSCH transmission scheme. In a Frequency Division Duplex (FDD) operation, the frame structure in the uplink and downlink, each comprises of a 10 millisecond (ms) Radio frame, which is in turn divided into ten subframes, each of 1 ms duration, wherein each subframe is divided into two slots of 0.5 ms each, wherein each slot contains a number of OFDM symbols. The downlink and uplink bandwidth are subdivided into resource blocks, wherein each resource block comprises of one or more subcarriers in frequency and one or more OFDM symbols in the time domain (12 subcarriers×7 OFDM symbols for normal Cyclic Prefix (CP)). In LTE resource blocks are defined on a slot basis. A resource block (RB) is typical unit in which the resource allocations are assigned for the uplink and downlink communications. Furthermore, the eNB configures appropriate channels for uplink and downlink control information exchange. For the DL the physical downlink control channel (PDCCH) is used for sending the uplink and downlink control information to the UEs. The PDCCH is sent in the beginning portion of a subframe on a potentially variable number of OFDM symbols, and this number (typically 0 to 3 for large system bandwidths such as 5 MHz, etc and 0 to 4 for smaller system bandwidths such as 1.25 MHz) is signaled on the Physical Control Format Indicator Channel (PCFICH) or sent via higher layer signaling. However, in other scenarios, the PDCCH may also be located in certain fixed or variable time/frequency/spatial resources i.e., spanning one or more subcarriers in one or more subframes and/or one or more spatial layers. For example, it may occupy a subset of resource blocks instead of spanning the entire DL system bandwidth. The Physical Hybrid ARQ Channel (PHICH) is the Acknowledgment indicator channel used to send the HARQ feedback on the DL for the uplink data transmissions from the UE. The PCFICH, PHICH, PDCCH are sent on OFDM symbols at the beginning of the DL subframes. In some subframes such as ABS or when the eNB has no UEs scheduled (i.e. very low or no load cases), these channels may be absent. In LTE Release-8, the master information block (MIB) is sent on the Physical Broadcast CHannel (PBCH), the MIB comprises of system frame number (SFN), downlink system bandwidth, number of signaled downlink transmit antennas (or the number of CRS ports), and Physical Hybrid ARQ Channel (PHICH) configuration (i.e. duration). In LTE Release-8, the PBCH is sent on subframe 0 (each subframe comprising of two slots, each slot corresponding to a 0.5 milli-second). The Synchronization signals are transmitted on the inner six PRBs or inner 72 subcarriers (i.e. 1.25 MHz) on subframes 0 and 5. The exact location of the Synchronization signals depends upon the duplex type, Cyclic Prefix length, etc.

If an MBSFN subframe is configured, the subframe may contain an initial portion (near the beginning of the subframe) containing a unicast region and the rest of the subframe may be configured differently based on the higher layer signaling. If the MBSFN subframe is used for transmission of multicast transmission channel (MTCH), then the rest of the subframe may contain multicast OFDM symbols with cyclic prefix (CP) that may be distinct (and likely larger) than the CP used for the initial transmission. In Rel-8/9, the MBSFN subframe configuration is typically sent in the SIB2 message, wherein the SIB2 message is a higher layer message sent on the PDSCH by the eNB. The schedule of SIB2, SIB3, (and other SIB messages) is indicated in SIB1. The System information typically changes on the order of SIB transmission window (e.g. in multiples of 8 ms) i.e. the system information update only when a new SI-transmission window begins and the UEs are paged to indicate a SI update so that they can re-acquire system information. Typically SIB transmissions are not allowed in MBSFN subframes as there may be no CRS in the data region of the MBSFN subframes.

It is possible to schedule new System information transmissions within the MBSFN region by transmitting a PDSCH associated with one or more dedicated reference signal (DRS) ports that UEs of newer release are able to process. For instance, signaling though higher layers (e.g. in MIB or SIB1) can be used to indicate UEs of newer release if they can receive SI in MBSFN subframes based on Rel-8 Downlink Control Information (DCI) Formats 1A or 1C or enhanced 1A or 1C. Such Rel-8 DCI 1A/1C or enhanced 1A/1C grants are transmitted in the common search space of the MSBFN subframes, with the CRC masked by SI-RNTI or another special RNTI (RNTI-specific search space) which is also signaled (or pre-configured) in the system information accessed prior to SIB1. The enhanced DL grants may indicate whether the UE can rely on dedicated reference ports or cell-specific reference ports for demodulating the corresponding PDSCH to recover SI information (or recover LLRs for soft combining across multiple SI-x receptions within the SI-x reception window) The enhanced DL grants may also indicate the number of DRS ports used to demodulate the SI-x PDSCH. In Rel-8/9, for Format 1C, the redundancy version determination (for HARQ channel encoding/decoding) is typically tied to the subframe number within the transmission window wherein the MBSFN subframes are skipped. However, for SI transmission in MBSFN subframes, the RV determination section may be different than that in Rel-8/9. Thus, the UE may keep track of two Redundancy Versions (RVs) or two Subframe Numbering, one for the existing LTE Rel-8/9 SI transmission opportunities, and a second one for SI transmissions within MBSFN subframes. For instance, the second RV may always be set to 0 or may be cyclically cycled through the available set of Redundancy versions. The same technique (i.e. transmissions in MBSFN subframes) as above may be applicable to Paging messages received via P-RNTI, or Random-Access messages received via RA-RNTI.

The SIB1 typically includes cell access related information such as Public Land Mobile Network (PLMN) identity, tracking area code, frequency band indicator, etc. SIB1 may also include cell selection information such as receive signal levels. The SIB1 also includes the scheduling information for other sytem information blocks such as the number of other SIBs, the sequence of transmission, the transmission window size, the periodicity (e.g. how many transmissions of each SIB within the transmission window), etc. The other SIBs include SIB2, SIB3, etc. These SIBs include additional system information that is required to get full service from the base station. For example, the additional system information can comprise of uplink system bandwidth, radio resource configuration information common to the cell, the MBSFN and/or other subframe configurations, mobility related parameters, cell selection parameters, neighbor cell information, intra/inter-frequency cell re-selection parameters, inter Radio-Access Technology (inter-RAT) reselection parameters, etc.

In Rel-10 and beyond systems, the signaling of the ABS patterns can be included in the SIB1 message, or in SIB2 message (re-using the same description as MBSFN subframe signaling), other SIBs, or sent on a UE-specific basis via RRC signaling such as a MAC message. The broadcast of this information is advantageous as it allows UEs in both connected and idle modes to access the ABS information and use it for handling interference for channel measurements, channel quality estimations, etc.

When the base station 301 implements the E-UTRA standard, the base station processor 316, in one embodiment, includes a logical channel coding and multiplexing section for implementing channel coding and multiplexing of control information and positioning reference signals destined for transmission over a downlink subframe 340. The channel coding and multiplexing section is a logical section of the base station processor 316, which performs the coding and multiplexing responsive to programming instructions stored in memory 318. The channel coding and multiplexing section may include one channel coding block for encoding control channel information (e.g., channel quality indicators, cell-specific reference symbols (CRS), rank indicators, and hybrid automatic repeat request acknowledgments (HARQ-ACK/NACK) into associated transmission resources (e.g., time-frequency resource elements) and another block for encoding positioning reference signals and other information typically communicated over the primary/secondary synchronization channel (e.g., P/S-SCH) into associated transmission resources. The channel coding and multiplexing section of the processor 316 may include additional coding blocks for encoding various other types of information and/or reference symbols used by the wireless communication device 201 for demodulation and downlink channel quality determination. The channel coding and multiplexing section of the processor 316 also includes a channel multiplexing block that multiplexes the encoded information generated by the various channel coding blocks into a subframe, which is supplied to the transmitter 312 for downlink transmission.

Each wireless communication device 201 can include one or more transmit antennas 320 (one shown for illustrative purposes), one or more receive antennas 322, 323 (two shown for illustrative purposes), one or more transmitters 325 (one shown for illustrative purposes), one or more receivers 327 (one shown for illustrative purposes), a processor 329, memory 331, a local oscillator 332, an optional display 333, an optional user interface 335, and an optional alerting mechanism 337. Although illustrated separately, the transmitter 325 and the receiver 327 may be integrated into one or more transceivers as is well understood in the art. By including multiple receive antennas 322, 323 and other appropriate hardware and software as would be understood by those of ordinary skill in the art, the UE may facilitate use of a MIMO antenna system for downlink communications.

The wireless communication device transmitter 325, receiver 327, and processor 329 are designed to implement and support a wideband wireless protocol, such as the UMTS protocol, the E-UTRA protocol, the 3GPP E-UTRA protocol or a proprietary protocol, operating to communicate digital information, such as user data (which may include voice, text, video, and/or graphical data) and/or control information, between the UE and a serving base station 301 over control and data channels. In an E-UTRA system, an uplink data channel may be a PUSCH and an uplink control channel may be a PUCCH. Control information may be communicated over the PUSCH and/or the PUCCH. Data is generally communicated over the PUSCH.

The processor 329 is operably coupled to the transmitter 325, the receiver 327, the memory 331, the local oscillator 332, the optional display 333, the optional user interface 335, and the optional alerting mechanism 337. The processor 329 utilizes conventional signal-processing techniques for processing communication signals received by the receiver 327 and for processing data and control information for transmission via the transmitter 325. The processor 329 receives its local timing and clock from the local oscillator 332, which may be a phase locked loop oscillator, frequency synthesizer, a delay locked loop, or other high precision oscillator. The processor 329 can be one or more of a microprocessor, a microcontroller, a DSP, a state machine, logic circuitry, or any other device or combination of devices that processes information based on operational or programming instructions stored in the memory 331. One of ordinary skill in the art will appreciate that the processor 329 can be implemented using multiple processors as may be required to handle the processing requirements of the present invention and the various other included functions of the UE. One of ordinary skill in the art will further recognize that when the processor 329 has one or more of its functions performed by a state machine or logic circuitry, the memory containing the corresponding operational instructions can be embedded within the state machine or logic circuitry as opposed to being external to the processor 329.

The memory 331, which may be a separate element as depicted in FIG. 3 or may be integrated into the processor 329, can include RAM, ROM, FLASH memory, EEPROM, removable memory (e.g., a subscriber identity module (SIM) card or any other form of removable memory), and/or various other forms of memory as are well known in the art. The memory 331 can include various components, such as, for example, one or more program memory components for storing programming instructions executable by the processor 329 and one or more address memory components for storing addresses and/or other identifiers associated with the wireless communication device 201 and/or the base stations 203-205. The program memory component of the memory 331 may include a protocol stack for controlling the transfer of information generated by the processor 329 over the data and/or control channels of the E-UTRA system, as well as for controlling the receipt of data, control, and other information transmitted by the different cells in the E-UTRA system. It will be appreciated by one of ordinary skill in the art that the various memory components can each be a group of separately located memory areas in the overall or aggregate memory 331 and that the memory 331 may include one or more individual memory elements.

The display 333, the user interface 335, and the alerting mechanism 337 are all well-known elements of wireless communication devices. For example, the display 333 may be a liquid crystal display (LCD) or a light emitting diode (LED) display and associated driver circuitry, or utilize any other known or future-developed display technology. The user interface 335 may be a key pad, a keyboard, a touch pad, a touch screen, or any combination thereof, or may be voice-activated or utilize any other known or future-developed user interface technology. The alerting mechanism 337 may include an audio speaker or transducer, a tactile alert, and/or one or more LEDs or other visual alerting components, and associated driver circuitry, to alert a user of the wireless communication device 302. The display 333, the user interface 335, and the alerting mechanism 337 operate under the control of the processor 329.

In E-UTRA Rel-10 methods for supporting enhanced inter-cell interference coordination (eICIC) techniques will be specified. Such methods are targeted towards increasing the spectral utilization of licensed (and unlicensed) bands by the deployment of Heterogeneous networks. Small to large handover bias has been considered for the macro/pico case where a pico UE in the coverage extension region of a pico cell (i.e., pico cell is not the strongest cell) is forced to associate with the said pico cell. Such a UE connected to a pico cell can experience elevated interference due to macro cell transmission in ABSs when scheduled by the pico cells in the macro cell's ABSs relative to when the macro cell transmission is absent (i.e., macro cells is configured for blank subframe transmission). This is because, a ABS always contains CRS and can potentially contain other channels such as P/S-SCH, PBCH, PCFICH, PHICH, PDSCH (associated with Paging and SIB1) and Positioning Reference Signal (PRS). Although, the pico cell transmission is received at a better signal quality over the macro cell's ABSs relative to non-ABSs, the quality of pico cell transmission in the macro cell's ABSs may still be inadequate to maintain association with the pico cell specially when legacy Rel-8/9 receivers are implemented in the UE. Several interference mitigation techniques for rejecting or cancelling interference of various signals in the ABSs is known in prior art. Among such methods are:

CRS interference rejection by suitable modification to LLRs including nulling REs associated with the pico cell transmission that overlap with the macro cell CRS transmission in a given subframe.

Processing of pico cell P/S-SCH post subtraction of the estimated macro cell P/S-SCH from the received signal.

Decoding of pico cell PDCCH post blind detection of macro cell PDCCH transmission followed by subtraction of the macro cell PDCCH component from the received signal. This method might require higher-layer assistance signal associated with the macro cell PDCCH transmission.

PCFICH/PHICH interference rejection by suitable modification to LLRs including nulling REs associated with the pico cell transmission that overlap with the macro cell PCFICH/PHICH transmission in a given subframe. This method might require higher-layer assistance signal associated with the macro cell PCFICH/PHICH transmission.

For the macro/femto case where a macro UE roams close to a CSG femto cell, a macro UE both in RRC_CONNECTED and RRC_IDLE states similarly experiences elevated interference due to femto DL transmission even when the macro cell is transmitting on the femto's ABSs.

For both the macro/pico and the macro/femto cases, the serving cell transmits a measurement pattern comprising subframes on which the UE is expected to perform RRM/RLM/CSI measurements. The restricted subframe measurement pattern is configured such that the UE performs measurements mostly on the ABSs of the dominant neighbor cell (i.e., the macro cell in the macro/pico case for a pico UE and a femto cell in the macro/femto case for the macro UE). Since ABSs contain at least the CRS and possibly other downlink signals transmitted by the dominant neighbor cell, the RLM/RRM/CSI measurements as defined in E-UTRA Rel-9 specification will likely be inadequate in supporting efficient deployment of Heterogeneous networks.

Specifically, E-UTRA Rel-9 measurements and procedures as described in TS 36.213, TS 36.214 and TS 36.133 are likely inadequate to cope with large interference signals present in ABSs. This invention is focused on addressing such issues.

In accordance to 3GPP RAN Working Group 1 (i.e., RAN1) Liaison Statement R1-105793, ABSs are defined as follows:

UEs can assume the following about ABSs:
  All ABSs carry CRS
  If PSS/SSS/PBCH/SIB1/Paging/PRS coincide with an ABS, they are transmitted in the ABS (with associated PDCCH when SIB1/Paging is transmitted)
    Needed for legacy support
    Channel State Information Reference Signal (CSI-RS) transmission on ABS is For Further Study (FFS)
  No other signals are transmitted in ABSs
  If ABS coincides with Multicast-Broadcast Single Frequency Network (MBSFN) subframe not carrying any signal in data region, CRS is not present in data region
  MBSFN subframe carrying signal in data region shall not be configured as ABS Although, RAN1 has primarily considered restricted subframe measurements (i.e., UE performing RRM/CSI/RLM measurements over set of subframes signaled by the serving eNB) for RRC connected mode, in RAN4, two contributions R4-103790 and R4-103738 that were presented discussed extending this concept to idle mode RRM measurements to address the macro/femto interference problem.

In cell range expansion (CRE) for the macro/pico case, a macro UE may be scheduled only on a subset of all possible subframes that corresponds to non-ABSs of the macro cell and the macro cell may not schedule any UE in the ABSs. In this set up, the pico cell may schedule its UEs both on subframes that coincide with the macro cell ABSs and subframes that coincide with macro cell non-ABSs. When medium to large HO bias (>4 dB) is used, this can lead to two sets of subframes each with different DL signal quality levels or two "virtual" channels with different downlink signal qualities.

In order that medium to large CRE (i.e., 4+ dB cell association bias) can be supported, a UE must implement a interference rejection (IR) receiver or a interference cancellation (IC) receiver to eliminate the interference from one or more of the above-listed signals present in the ABS. IR and IC are referred to herein generically as interference reduction. Such a receiver capability may also be necessary in the macro/femto case to enable a macro UE to remain connected to the macro cell under strong interference from a nearby non-allowed CSG femto cell. With such a capability, a UE will be able to remain connected to the desired cell (i.e., pico cell in the macro/pico case and macro cell in the macro/femto case) that is 4+ dB weaker than the strongest cell (i.e., macro cell in the macro/pico case and femto cell in the macro/femto case).

IR/IC techniques known in prior art as applicable to rejecting/cancellation of the different signals transmitted in ABSs are summarized below. The desired signal is can be one of CRS, P/S-SCH, PBCH, PCFICH, PHICH, CSI-RS, PDCCH, PDSCH, Demodulation Reference Signal (DM-RS or DRS), User Equipment-Specific Reference Signal (UE-RS), and Channel State Information Reference Signal (CSI-RS).

P/S-SCH: If PSS/SSS in the ABS interferes with the desired signal, the UE must cancel the strong cell interference using typical interference cancellation techniques known in the art, including for example the method taught in US20100029262.

PBCH: If PBCH in the ABS interferes with the desired signal, the UE may decode the PBCH first, subtract the reconstructed PBCH signal corresponding to the decoded the MIB codeword from the received signal and then process the received signal.

PDCCH: If PDCCH in ABS interferes with the desired signal, a method similar to PBCH IC which includes decoding followed by cancellation can be used (typical interference cancellation techniques known in the art) for example, the method taught in US20100190447 may be used.

CRS: If CRS in the ABS interferes with the desired signal, one method is CRS IC which involves first estimating the neighbor cell channel, reconstructing the CRS component using the CRS template, subtracting the estimated CRS component from the received signal and estimating the serving cell channel from the residual signal. A second method is CRS IR which involves nulling REs that overlap with neighbor cell CRS prior to processing of the desired signal.

PCFICH/PHICH: If PCFICH or PHICH in ABS interferes with the desired signal, it is generally much difficult to perform IC although IR is feasible.

PRS: If PRS in ABS interferes with the desired signal, PRS IR or IC can be carried out in a manner similar to CRS IR or IC.

Once the UE detects the PCID and frame/OFDM symbol timing of a neighbor cell and receives the ABS configuration corresponding to the neighbor cell from the serving cell, the UE generally knows the following:

P/S-SCH time/frequency location and signal structure of the interferer.

Therefore, if the interfering signal is P/S-SCH, together with the PCID and the frame/OFDM symbol timing of the neighbor cell, the UE sufficient information to estimate the component of P/S-SCH in the received signal and cancel it.

But, if the interfering signal is not P/S-SCH, the UE may require further information pertaining to the neighbor cell transmission in order to perform IR or IC such DL channels in a computationally feasible manner. Such information pertaining to the said DL channels may be included a assistance data signaled to the UE. The assistance data may be included in the system broadcast messages such as System Information Blocks or in Radio Resource Configuration (RRC) messages or other UE-specific messages. The signaling of such assistance information to enable UE IR/IC is further discussed below.

PCFICH/PDCCH/PHICH: If the interfering signal is one of PCFICH, PHICH, and PDCCH, the UE may be made aware of at least the number of OFDM symbols in the control region (i.e., PCFICH codeword transmitted by the neighbor cell), the number of OFDM symbols on which PHICH is transmitted, and the set of REs over which one or more PDCCH codewords are transmitted (i.e., the set of occupied CCEs). If the interfering signal is PHICH, the UE may be made aware of the PHICH duration which preferably remains constant over all ABS subframes for the strong interferer.

PRS: The UE may or may not have positioning capability i.e. the capability to process Positioning Reference Signals (PRS). Further, the serving cell may not be a participant in E-UTRA positioning or have the capability of supporting E-UTRA Location Based Services (LBS) including support for LTE Positioning Protocol (LPP). As a result, the UE may not have access to PRS assistance information which is normally transported in LPP that identifies the time-frequency resources (i.e., radio frames, subframes, bandwidth, etc.) used for transmission of PRS by the different cells in a certain geographical area. In these cases, the UE must be made aware of PRS pattern and the associated assistance information to enable the UE to perform IR or IC of the PRS signal. Just like other signals transmitted from a neighbor cell, neighbor cell's PRS can also severely interfere with desired signals. Note that the neighbor cell PCID and coarse timing are typically known after cell detection. But, this is usually insufficient for determining whether or not neighbor cell is transmitting PRS and whether or not PRS interference is a potential problem.

According to TS 36.211, the PRS is transmitted in resource blocks in downlink subframes configured for positioning reference signal transmission. If both normal and MBSFN subframes are configured as positioning subframes within a cell, the OFDM symbols in a MBSFN subframe configured for positioning reference signal transmission shall use the same cyclic prefix as used for subframe #0. If only MBSFN subframes are configured as positioning subframes within a cell, the OFDM symbols configured for positioning reference signals in these subframes shall use extended cyclic prefix length. In a subframe configured for positioning reference signal transmission, the starting positions of the OFDM symbols configured for positioning reference signal transmission shall be identical to those in a subframe in which all OFDM symbols have the same cyclic prefix length as the OFDM symbols configured for positioning reference signal transmission. Positioning reference signals are transmitted on antenna port 6. The positioning reference signals shall not be mapped to resource elements (k,l) allocated to PBCH, P/S-SCH regardless of their antenna port p. Positioning reference signals are defined for subcarrier spacing $\Delta f=15$ kHz only. The bandwidth for positioning reference signals and $N_{RB}^{PRS}$ is configured by higher layers and the cell-specific frequency shift is given by $v_{shift}=N_{Cell}^{ID}$ mod 6 where $N_{Cell}^{ID}$ is the PCID.

Figure 4:
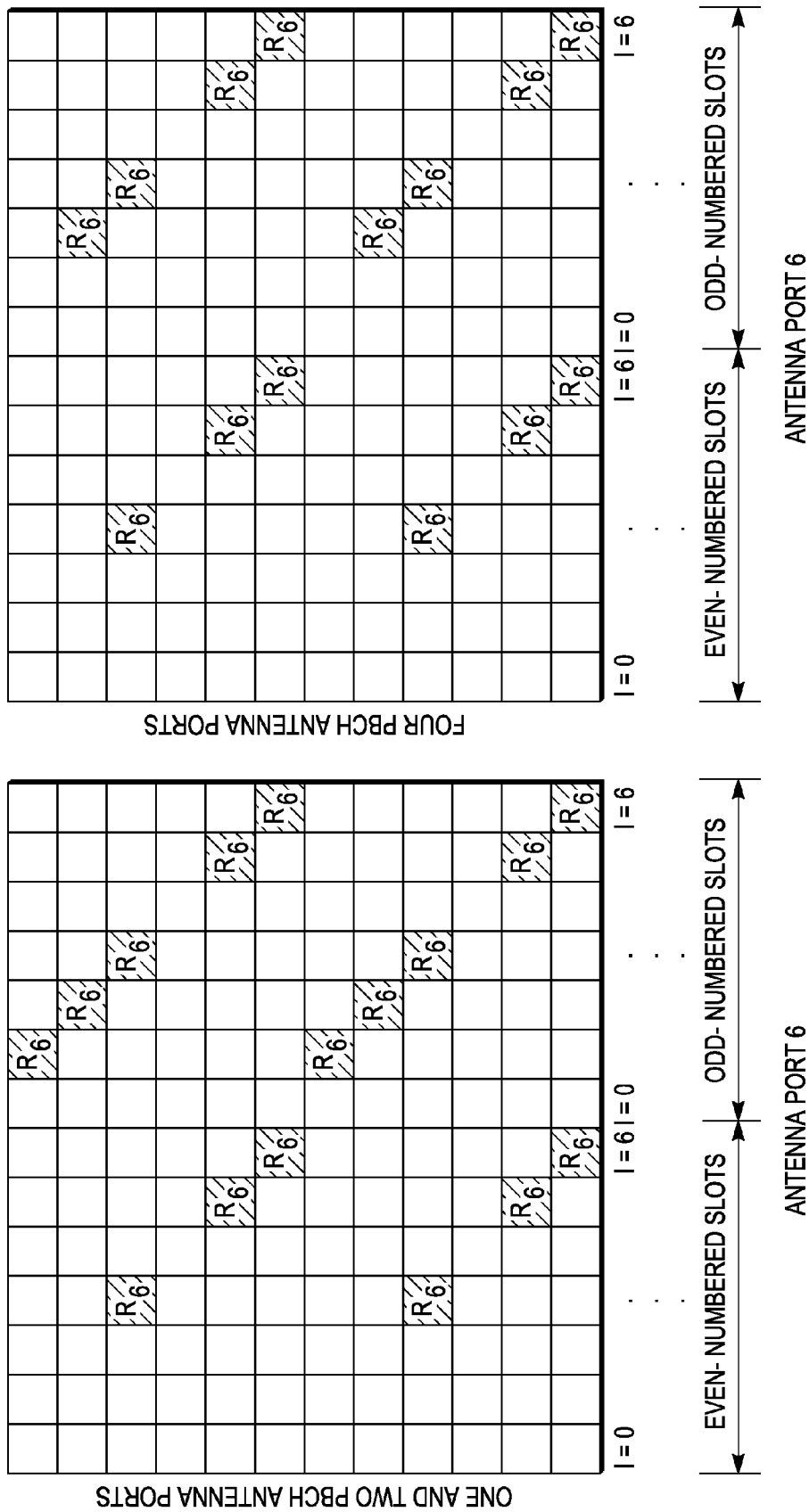
FIG. 4 shows a positioning reference signal transmission from a base station in accordance with E-UTRA Rel-9 specification.

FIG. 4 shows a schematic of PRS transmission one subframe showing 1 PRB for a subframe with normal CP.

According to TS 36.211, the cell specific subframe configuration period $T_{PRS}$ and the cell specific subframe offset $\Delta_{PRS}$ for the transmission of positioning reference signals are listed in the Table 1 below.

TABLE 1

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | | Reserved |

The PRS configuration index $I_{PRS}$ is configured by higher layers. Positioning reference signals are transmitted only in configured DL subframes. Positioning reference signals shall not be transmitted in special subframes. Positioning reference signals shall be transmitted in $N_{PRS}$ consecutive downlink subframes, where $N_{PRS}$ is configured by higher layers.

The positioning reference signal instances, for the first subframe of the $N_{PRS}$ downlink subframes, shall satisfies $(10 \times n_f + \lfloor n_s/2 \rfloor - \Delta_{PRS}) \mod T_{PRS}=0$, where $n_f$ is the System Frame Number (SFN, in the range 0, 1, . . . , 1023) and $n_s$ is the slot number (in the range 0, 1, . . . , 19).

As indicated earlier, the higher-layer signaling of $I_{PRS}$, $N_{PRS}$ and PRS BW may not be available to a UE that does not have positioning capability or LPP support. But, such a UE when it is capable of eICIC support must be capable of rejecting or canceling PRS interference to the desired signal to ensure reliable operation in E-UTRA Rel-10.

In the absence of UE positioning capability, PRS assistance data may be transmitted to the UE indicative of the PRS transmission from a neighbor cell in ABS containing occasional PRS transmissions. The PRS assistance data may contain one or more of the following elements.

Neighbor cell's PRS occasion pattern in time domain, for example the $I_{PRS}$ parameter which signals the periodicity of PRS occasions and the time offset of this pattern relative to reference cell SFN#0 (i.e., both the subframe offset and the PRS occasion periodicity can be signaled).

Neighbor cell's $N_{PRS}$—the number of consecutive subframes in one PRS occasion Neighbor cell's PRS BW Neighbor cell OFDM symbol Cyclic Prefix (CP) associated with the PRS transmission Neighbor cell's number of CRS transmit antenna ports The PRS periodicity is 160, 320, 640 or 1280 ms as indicated in Table 1, while the ABS pattern has a 40 ms periodicity. Therefore, only a subset of ABS contains PRS signals.

The parameters listed above together with neighbor cell PCID, number of CRS transmit antenna ports and CP length uniquely determine the structure and sequence associated with the neighbor cell PRS signal in ABS. This information should therefore be provided to (or determined by) a UE that is expected to process a neighbor cell ABS with PRS for rejecting or canceling interference.

PRS IR may comprise simply nulling the REs or Log-likelihood Ratios (LLRs) associated with REs of the desired signal that overlap with the neighbor cells PRS REs. The nulled REs or nulled LLRs lead to the rejection of neighbor cell's PRS component in the received signal. LLR nulling can be applied prior to decoding of a codeword carrying the desired information, where the codeword may one of a block code (PCFICH and PHICH), a convolutional code (PBCH and PDCCH), and a turbo-code (PDSCH).

PRS IR/IC may be applied to demodulation/processing of at least one desired signal among CRS, P/S-SCH, PBCH, PCFICH, PHICH, CSI-RS, PDCCH, PDSCH, DM-RS, and UE-RS.

Figure 5:
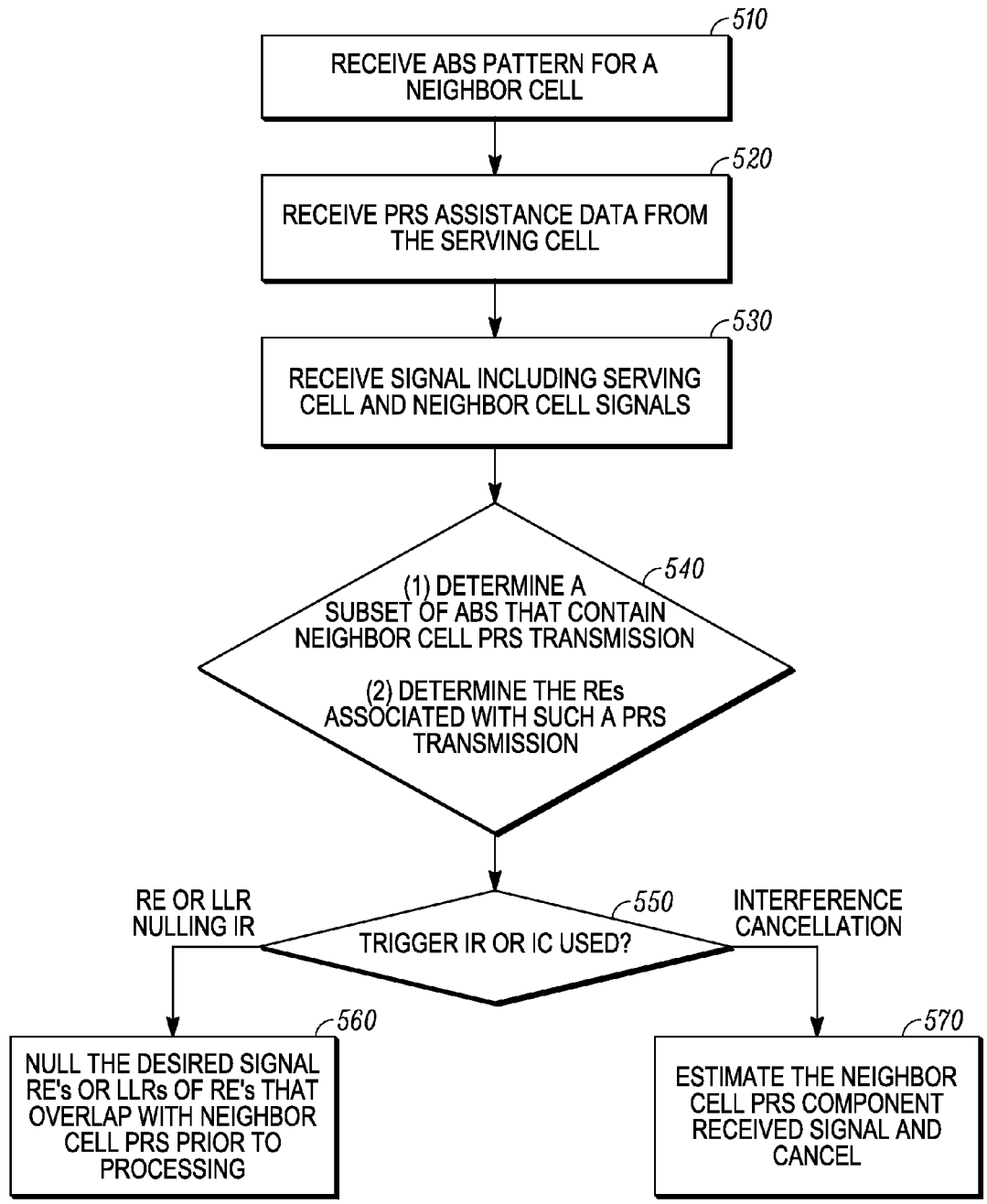
FIG. 5 illustrates the flowchart for an exemplary embodiment of the present invention for Positioning Reference Signal Interference Rejection or Interference Cancellation.

FIG. 5 shows a flowchart 500 of UE operations illustrating an exemplary embodiment in accordance with the present disclosure. At 510, the UE receives an ABS pattern for a neighbor cell. At 520, the UE receives PRS assistance data from the serving cell. At 530, the UE receives serving cell and neighbor cell signals. At 540, the UE determines a subset of ABS that contains a neighbor cell PRS transmission and the UE determines the REs associated with such a PRS transmission. At 550, the UE determines whether IR or IC triggering is used. At 560, for IR, the UE nulls the desired signal REs or LLRs of REs that overlap with neighbor cell PRS prior to processing. At 570, for IC the UE estimates the neighbor cell PRS component received signal and cancellation occurs.

When the neighbor cell interference to a desired signal is degrading the demodulation/decoding performance of the desired signal, the UE can either (1) autonomously trigger IR or IC for one or more of the DL channels in the ABS or (2) can do so based on a network trigger.

In the first approach (i.e., autonomous triggering of IR or IC), the UE determines that IR or IC is necessary based on a signal strength threshold such as the event that the RSRP difference between the strongest neighbor and the serving cell exceeds a certain threshold. The said threshold can be a fixed quantity, say, 4 dB or it can be a network signaled threshold transported from the serving cell to the UE via higher layers such as through a. RRC message or System Information Broadcast message. Alternately, the CQI dropping below a certain threshold can be used as an indication that the neighbor cell interference is strong and IR or IC must be triggered. In this case, the UE may indicate to the network that it has triggered IR or IC so that the network can use that information while scheduling the UE. It is also possible for an eNB to implicitly deduce that the UE is using IR or IC based on one or more other signals from the UE (CQI reports, UL SRS transmissions, A/N transmissions, etc).

In the second approach (i.e., network triggered IR or IC), the UE reports the RSRP or RSRQ or other measurements such as CSI (including one or more of a CQI, PMI, RI) corresponding to the serving cell. Furthermore, the UE can report RSRP or RSRQ or CSI for one or more neighbor cells. Based on these reports from the UE, the network can send a RRC message instructing the UE to perform IR or IC for one or more channels in the ABS. The list of channel for which the UE must perform IR or IC for may also be signaled to the UE in the control message. In a typical example, when the UE goes near a closed femto cell, the UE reports to its serving eNB that it is close to a closed femto cell, and then the eNB can inform the UE to start IR/IC to be able to receive the messages such as Paging, Synchronization Signals, etc.

Figure 6:
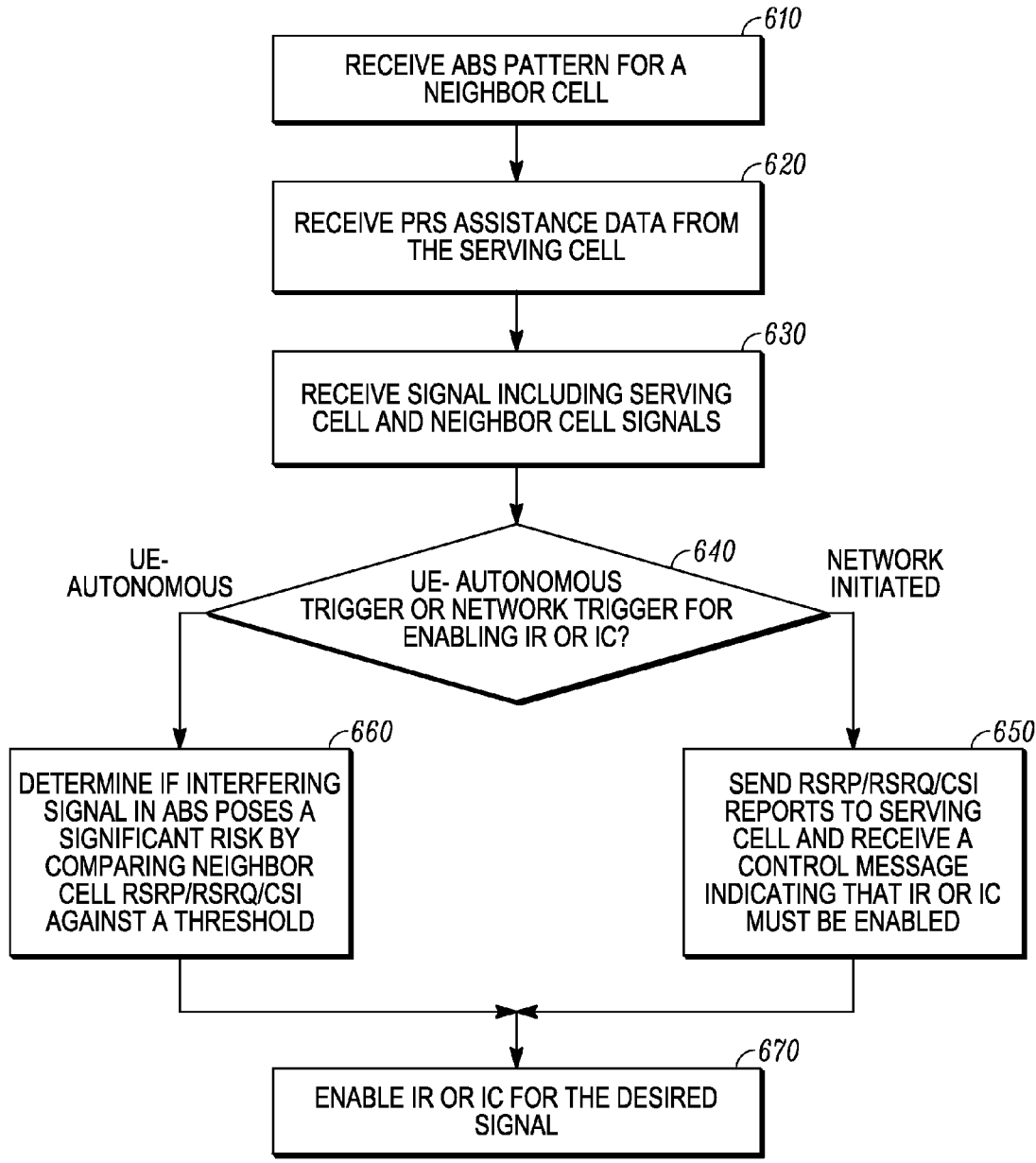
FIG. 6 illustrates the flowchart for another exemplary embodiment of the present invention for enabling Interference Cancellation or Interference Rejection based on a UE-autonomous trigger or a network initiated trigger.

FIG. 6 shows a flowchart 600 of UE operations illustrating an exemplary embodiment in accordance with the present invention. At 610, the UE receives an ABS pattern for a neighbor cell. At 620, the UE receives PRS assistance data from the serving cell. At 630, the UE receives serving cell and neighbor cell signals. At 640, the UE determines whether a trigger for enabling IR or IC is network based or UE based. At 650, for network initiated triggering, the UE sends RSRP/RSRQ/CSI reports to the serving cell and receives a control message indicating the IR or IC must be enabled. At 660, for autonomous UE triggering, the UE determines if an interfering signal in ABS poses a significant risk by comparing neighbor cell RSRP/RSRQ/CSI against a threshold. At 670, IR or IC is enabled for the desired signal.

CRS: If the interfering signal is the neighbor cell CRS transmission, the UE may be made aware of the following:
a. neighbor cell bandwidth (BW) for example expressed as the number of Physical Resource Blocks (PRBs)
b. neighbor cell's number of CRS transmit antenna ports
c. an indication of the type of subframes in the ABS pattern for example including an indication of which subframes in the ABS pattern are normal, MBSFN or fake UL subframes.

PBCH: If the neighbor cell PBCH is the interfering signal, the UE may be made aware of neighbor cell's number of transmit antenna ports so that the PBCH encoding structure is known. This can facilitate the UE receiver in demodulating and decoding of the Master Information Block (MIB) codeword embedded in the PBCH. After decoding the MIB, the UE may reconstruct the component of the neighbor cell PBCH signal and cancel it from the received signal so that interference to the desired signal is mitigated. The PBCH encoding can be one of Single Input Multiple Output (SIMO), Space-Frequency Block Coding (SFBC) and Space-Frequency Block Coding with Frequency-Switched Transmit Diversity (SFBC-FSTD).

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

What is claimed is:

1. A method in a wireless communication terminal, the method comprising:
receiving, at the wireless communication terminal, a subframe that belongs to a first subset of subframes, the subframe including a desired signal from a first base station and an interference signal,
wherein the interference signal includes a cell-specific reference signal transmitted by a second base station;
receiving, at the wireless communication terminal, assistance information from the first base station, the assistance information including a number of cell-specific reference signal antenna ports configured in the second base station;
determining a structure associated with the cell-specific reference signal based on the assistance information;
reducing interference from the cell-specific reference signal on the received subframe based on the determined structure of the cell-specific reference signal; and
recovering the desired signal.

2. The method of claim 1, the receiving information regarding the first subset of subframes via higher layer signaling.

3. The method of claim 1 wherein the desired signal is one of a cell-specific reference signal (CRS), synchronization signal, primary synchronization signal, secondary synchronization signal, physical downlink control channel (PDCCH), physical downlink shared channel (PDSCH), physical hybrid ARQ indicator channel (PHICH), physical control format indicator channel (PCFICH).

4. The method of claim 1 wherein the first subset of subframes corresponds to almost blank subframes of the second base station.

5. A wireless communication terminal comprising:
a transceiver configured to receive a subframe belonging to a first subset of subframes,
the subframe including a desired signal from a first base station and an interference signal, the interference signal including a cell-specific reference signal transmitted by a second base station;
a processor coupled to the transceiver,
the processor configured to determine a structure associated with the cell-specific reference signal based on assistance information, reduce interference from the cell-specific reference signal on the received subframe based on the determined structure of the cell-specific reference signal, and recover the desired signal.

6. The terminal of claim 5, the assistance information including a number of cell-specific reference signal (CRS) antenna ports configured in the second base station.

7. The terminal of claim 5, the processor configured to process information regarding the first subset of subframes, the information received via higher layer signaling.

8. The terminal of claim 5, the assistance information including at least one of the following:
- a reference signal occurrence pattern in time domain;
- a reference signal bandwidth;
- a number of consecutive subframes carrying the reference signal; and
- a cyclic prefix (CP) length associated with the reference signal.

9. The terminal of claim 5, the processor configured to reduce interference by rejection of the cell-specific reference signal transmitted from the second base station.

10. The terminal of claim 9, the processor configured to reject by nulling a log-likelihood ratio (LLR) of a resource element of the desired signal that overlaps with a resource element of the cell-specific reference signal.

11. The terminal of claim 5, the processor configured to reduce interference by cancellation of the cell-specific reference signal transmitted from the second base station.

12. The terminal of claim 11, the processor configured to reduce interference by cancellation of an estimated component of the cell-specific reference signal transmitted from the second base station.

13. The terminal of claim 5, the processor configured to trigger interference reduction upon determination of a condition.

14. The terminal of claim 5, the transceiver configured to receive a radio resource control (RRC) command to reduce interference.

15. The terminal of claim 14, wherein the RRC command is received in response to transmitting a report from the wireless communication terminal, the report including one of the following: reference signal received quality (RSRQ); reference signal received power (RSRP); or channel quality indicator (CQI).

16. The terminal of claim 15, wherein the report includes a reference signal received power (RSRP) difference between the first base station and the second base station exceeding a RSRP threshold or a CQI on a restricted set of subframes falling below a channel quality indicator (CQI) threshold.

17. The terminal of claim 16, wherein the RSRP threshold or the CQI threshold is signaled via higher layers or is predetermined.

18. The terminal of claim 5, wherein the desired signal is one of a cell-specific reference signal (CRS), synchronization signal, primary synchronization signal, secondary synchronization signal, physical downlink control channel (PDCCH), physical downlink shared channel (PDSCH), physical hybrid ARQ indicator channel (PHICH), physical control format indicator channel (PCFICH).

19. The terminal of claim 5, wherein the first subset of subframes corresponds to almost blank subframes of the second base station.

* * * * *